C. L. SANBORN & H. M. SHAW.
Sectional Steam-Boilers.

No. 161,161.

Patented March 23, 1875.

Witnesses.
C. Warren Brown.
L. E. Hazzard.

Inventors.
H. M. Shaw
C. L. Sanborn
by their Atty.

UNITED STATES PATENT OFFICE.

CALEB L. SANBORN AND HENRY M. SHAW, OF BOSTON, MASSACHUSETTS.

IMPROVEMENT IN SECTIONAL STEAM-BOILERS.

Specification forming part of Letters Patent No. 161,161, dated March 23, 1875; application filed January 12, 1875.

*To all whom it may concern:*

Be it known that we, CALEB LEAVITT SANBORN and HENRY MORRILL SHAW, both of Boston, in the county of Suffolk and State of Massachusetts, have invented an Improvement in Sectional Steam-Boilers; and we do hereby declare that the following, taken in connection with the drawings which accompany and form part of this specification, is a description of our invention sufficient to enable those skilled in the art to practice it.

Our invention relates to that class of boilers known as sectional steam-boilers, and is made up of sections so constructed and arranged that, when placed in position, semicircular flanges or ribs on each section unite and form a continuous partition, said partition making the division between the direct and return flues.

Figure 1:
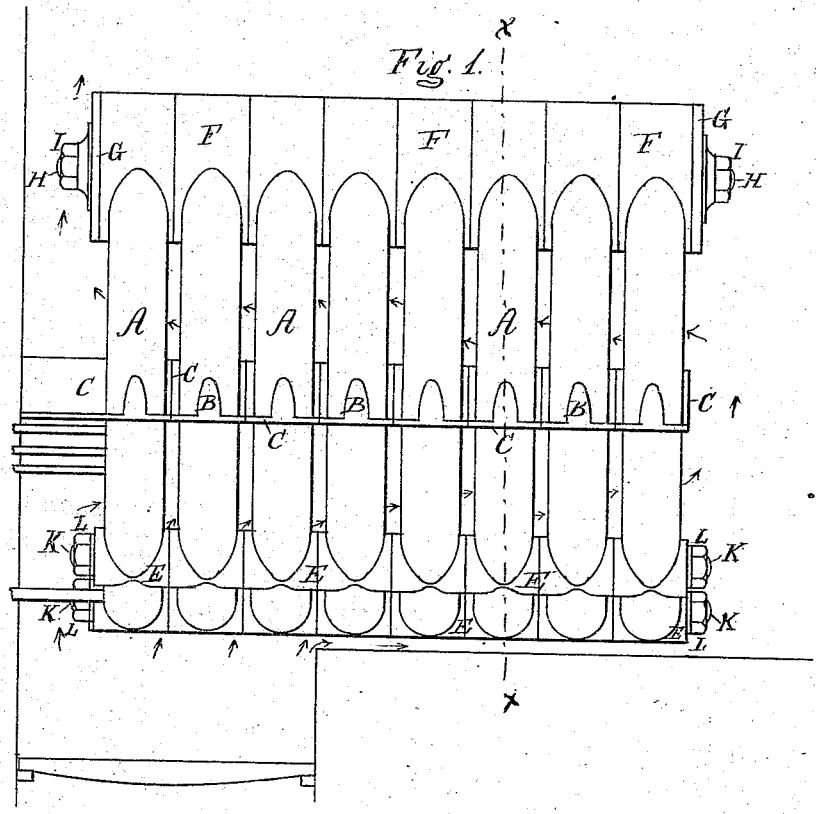
Figure 2:
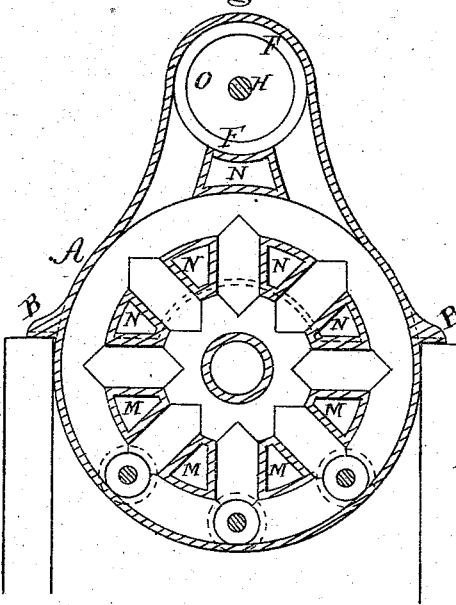

In the drawing which accompanies this specification, Figure 1 represents a series of these sections in elevation, and Fig. 2 a vertical section on line x x.

A A represent the sections, on which are lugs B B, which rest on the wall, and keep the sections in position, and ribs or projections C C, which, when the sections are fastened together, form a partition to guide the flames and smoke from the fire-box the length of the boiler, and return to the chimney. E E are bosses on the outer circle of the wheel, the openings through which allow the water to circulate and change about at will; and, when bolted together, the parts F F make one continuous steam-chamber, O. At each end of the steam-chamber are heads G G, and extending through them and the chamber O is the rod H, and the whole are clamped together by the nuts I. We also extend rods K K through the openings in the bosses E E, and on the ends thereof nuts L L, the setting up of which make joints as tight as though all of one piece.

The boiler being in position, its peculiar arrangement allows the heat to reach every part of it by passing up from the fire-box under the sections A, or through the openings M M below the partition C, returning over the partition through openings N, and passing off.

The safety-valve, steam-pipe, gages, &c., are attached in any ordinary manner.

We claim—

A steam-generator composed of sections, made up of two or more annular hollow rings, connected with each other by radial tubes, the outer ring being connected, by tubes, with a steam-chamber, and having semicircular ribs, which, when the sections are placed in position, form the upper apertures into return-flues, substantially as shown and described.

HENRY MORRILL SHAW.
CALEB LEAVITT SANBORN.

Witnesses:
C. WARREN BROWN,
L. E. HAZZARD.